Jan. 20, 1931.  C. R. SHORT  1,789,714

CONNECTING ROD BEARING

Filed Nov. 18, 1927

Inventor
Charles R Short
By Spencer, Hardman and Fehr
His Attorney

Patented Jan. 20, 1931

1,789,714

UNITED STATES PATENT OFFICE

CHARLES R. SHORT, OF DETROIT, MICHIGAN, ASSIGNOR TO THE MORAINE PRODUCTS COMPANY, OF DAYTON, OHIO, A CORPORATION OF OHIO

CONNECTING-ROD BEARING

Application filed November 18, 1927. Serial No. 234,085.

This invention relates to the manufacture of articles having surfaces adapted to be placed in rubbing contact with a relatively movable part such as bearings, and most particularly to cylindrical bearings for rotating shafts, or reciprocating rods.

The principal object of the present invention is to provide a bearing or similar part having a contact portion comprising a relatively porous metallic structure capable of containing a lubricant, reinforced by a portion made of metal having relatively high mechanical strength.

According to the present invention this object is accomplished by making a relatively thin sheet or plate of the porous metallic structure, forming this sheet into the desired shape and assembling this plate between the reinforcing portion and the part movable relatively thereto in such a way that the plate can be entirely removed on disassembling the bearing, and is free to move in the assembly relative to the other parts thereof while the bearing is in operation. In other words, according to this invention the porous metallic structure which constitutes the bearing surface is free to move relative to its reinforcing back, instead of being immovably secured thereto as in my copending application 188,930, filed April 11, 1927.

While in the preferred embodiment of the invention hereinafter described in detail I have disclosed only a cylindrical bearing, the invention is not limited to such form of bearing, but flat bearings may also be constructed in accordance with the provisions of this invention. The invention, however, relates most particularly to cylindrical bearings, such for instance as the main and connecting rod bearings of an internal combustion engine.

Further objects and advantages of the present invention will be apparent from the following description, reference being had to the accompanying drawings, wherein a preferred form of embodiment of the present invention is clearly shown.

Figure 1:
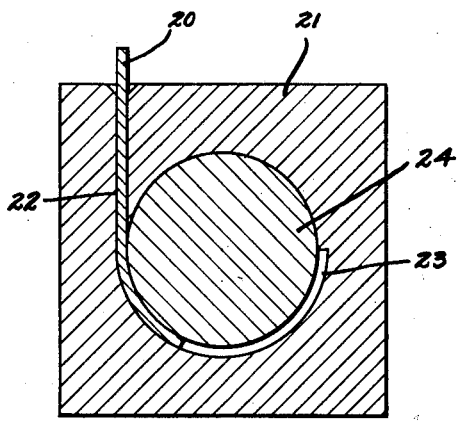
Fig. 1 is a sectional view showing an apparatus for bending the porous metal sheet into a preliminary form.

The reference numeral 20 indicates a porous metallic plate which constitutes the bearing surface of a bearing constructed in accordance with the present invention. This plate may be made in the manner set forth in the patent to H. M. Williams No. 1,642,347. A mixture of bronze forming metal powders, a filler such as graphite and a volatile void forming substance such as salicylic acid is briquetted in the form of a flat plate. This form is then sintered in a non-oxidizing atmosphere at a temperature and for a time sufficient to cause the metal particles to unite and the void forming substance to volatilize, which produces a metallic structure interspersed with a number of minute inter-communicating voids for receiving lubricant.

The metallic plate 20, if formed according to the above described method is of substantially the same degree of porosity throughout and may be employed as the bearing surface in a bearing made in accordance with this invention, but other metallic structures may be employed with equally good results. For instance, the plate 20 may be of the laminated construction described in my copending application Serial No. 221,341, filed September 14, 1927. That application discloses a metallic plate for use as a bearing surface, which is composed of a plurality of layers, one of said layers being more porous than the other.

There are a number of methods disclosed in said application for making this plate but these form no part of this invention and will not be described herein. It is obvious, however, that the plate made by any of these methods may be employed as the bearing surface of a bearing made in accordance with the present invention, in other words, this invention is not limited to a bearing having a bearing surface of any particular porous metallic structure made in any particular manner; on the contrary the bearing surface may be of any suitable porous metallic structure.

Figure 2:
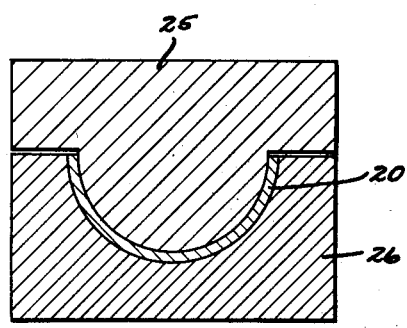
Fig. 2 is a view partly in section showing apparatus for bending the porous metal sheet into final form.

When the bearing plate 20 is briquetted in flat form it must be bent into semi-cylindrical form before assembling in a cylindrical bearing. A suitable apparatus for bending the plate is shown in Figs. 1 and 2. Fig. 1 shows a block 21 provided with a straight groove 22 merging with a semi-circular groove 23 which partly surrounds a cylindrical plug 24 which is supported by the block 21, but may be removed therefrom. The plate 20 is pushed into the groove 22 and then into the groove 23 in order to give it a semi-cylindrical shape. The plug 24 may be withdrawn from the block to facilitate removal of the plate 20. On being removed the plate 20 will spring out of shape so that a further operation to give it the desired final form may be required. This operation is performed by squeezing the plate 20 between relatively movable members 25 and 26 as shown in Fig. 2. It has been found desirable to use the apparatus shown in Fig. 1, to perform a preliminary bending step because the material is relatively weak in tensile strength and if subjected while in the flat state to the action of members 25 and 26, the tensile strain to which it is subjected might be so great at certain points as to destroy the sheet entirely. The apparatus of Fig. 1 overcomes this difficulty by causing the piece to be bent gradually from flat to cylindrical form.

While the porous metallic plate may be bent in other ways into the desired form, the one which has been described is particularly suitable on account of the character of the material worked upon. There is considerable resistance offered to the forcing of the plate 20 through the grooves 22 and 23 due to friction between the plate and the walls of the grooves. As the porous plate is being bent it is being compressed to a substantial degree in the direction of its movement through the grooves. This compressing or compacting of the structure of the porous metal tends to offset the tendency to pull apart those portions which would ordinarily be in tension during the bending operation. In other words the compacting of the plate overcomes its tendency to crack at its outer or convex surface. Due to its porosity the plate 20 can be compressed to a substantial degree as it is driven through the grooves 22 and 23, therefore, the above described method of bending has proven particularly satisfactory.

The curvature of the mandrel 24 is preferably substantially the same as that of the shaft with which the bearing cooperates, but this is not essential. For instance the mandrel could be smaller in diameter than the shaft for the bearing, because the bearing plate would spring to a curvature of greater radius than the mandrel as soon as the plate is removed from the groove 23.

While this is a most satisfactory method of bending a flat metallic plate to the desired semi-cylindrical form, it is not at all necessary that this method be employed. Any suitable method of bending the plate may be adopted. In fact, it is not material, so far as this invention is concerned, that the porous materials from which the bearing surface is made be briquetted flat and then bent to the desired shape. The materials could just as well be briquetted in the semi-cylindrical form in which they are assembled in the bearing. In other words, while a preferred method of forming the semi-cylindrical plate 20 is described herein to facilitate understanding of the invention, the method of forming the plate is entirely beyond the scope of this invention and any desirable method may be employed.

Figure 4:
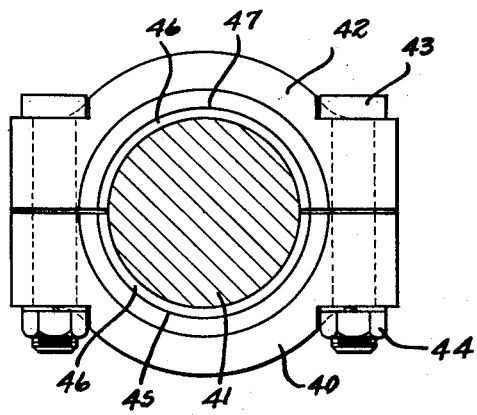
Fig. 4 is a fragmentary end elevation of a bearing constructed in accordance with the provisions of this invention which is of general application to a horizontal shaft.
Figure 3:
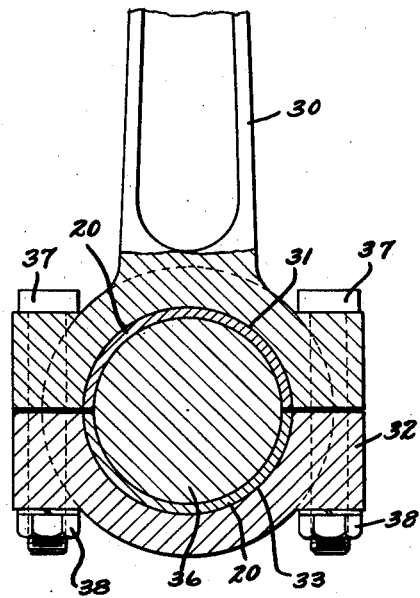
Fig. 3 is a fragmentary view, partly in section of a connecting rod provided with a bearing according to the present invention.

Figs. 3 and 4 show a connecting rod bearing constituting a preferred form of this invention. A connecting rod 30 is provided with a semi-cylindrical surface 31 adapted to receive the porous metallic bearing plate 20 of any desired thickness, preferably 20 to 60 thousands of an inch. A connecting rod cap 32 is provided with a similar semi-cylindrical surface which is also adapted to receive a semi-cylindrical bearing plate 20. Both the rod 30 and cap 32 are preferably made of steel relatively high in carbon, though the steel ordinarily employed in the construction of connecting rods may be used. As will be more fully set forth hereinafter the bearing surface moves relative to the connecting rod and cap during operation of the bearing, causing wear on the surfaces of said rod and cap contacting with the bearing surface. The rod and cap are therefore, preferably made of high carbon steel because of its wear resisting qualities. The surfaces 31 and 33 are finished smooth in any desirable manner. The semi-cylindrical, porous metallic plates 20 are positioned in engagement with surfaces 31 and 33, and the bearing assembled around the shaft 36, the connecting rod and cap being secured in position around the shaft by bolts 37 having nuts 38 thereon. When the bearing is assembled the semi-cylindrical plates 20 lie between the shaft and the polished surfaces 31 and 33 of the connecting rod and cap with the edges of the two plates 20 engaging each other. The entire bearing surface in engagement with the rotating shaft is formed by two contacting semi-cylindrical porous metallic plates, which form a complete cylindrical bearing surface. This bearing surface is floating, in other words, it is not attached to any of the parts of the assembly and can move relatively to shaft 36, rod 30 or cap 32.

In Fig. 4 is disclosed an end elevation of a bearing which is of more or less general application to horizontal shafts, for instance as a bearing for an engine crank shaft. This bearing comprises the supporting part 40 which supports the shaft 41 and the cap 42 which is secured to the part 40, when the bearing is assembled, by bolts 43 having nuts 44. The shaft supporting member 40 is provided with a semi-cylindrical surface 45 which is adapted to receive a semi-cylindrical porous, metallic bearing plate 46 similar to the plate 20 previously described. The cap 42 is provided with a semi-cylindrical surface 47 which is also adapted to receive a porous metallic bearing plate 46.

The supporting member 40 and cap 42 are preferably made of steel relatively high in carbon for reasons above set forth and the surfaces 45 and 47 are highly polished to eliminate all possible friction between these surfaces and the bearing plates 46 when the said plates move relatively to the elements 45 and 47. When the bearing is assembled the edges of bearing plates 46 engage each other to form a loose or floating cylindrical bearing of porous metallic structure for the shaft 41, functioning in just the same manner as do the plates 20 in the connecting rod bearing previously described.

The bearing plate 20 or 46 should be impregnated with lubricant before assembling the bearing, by immersing in a bath of hot lubricating oil.

The advantages of the bearing forming the subject of this invention are several. For instance if the porous metallic bearing surface in a bearing of the type disclosed in application No. 188,930, in which the bearing surface is bonded to the reinforcing back, becomes loose or wears the bearing will break down and must be either discarded or rebuilt. In a bearing of the type disclosed herein, however, if the bearing surface wears out or is otherwise defective, it may be readily removed and a new bearing surface substituted therefor. The replacement of this removable bearing surface is relatively inexpensive, and does not require highly skilled labor nor a great amount of time.

In a bearing of the type disclosed herein the effect of wear is also reduced. Since the bearing surface is movable relatively to its reinforcing member as well as to the rotating shaft or other movable part the speed of the shaft relative to the bearing surface in contact therewith should be only approximately half as great as when the bearing surface is secured to the reinforcing member, thus reducing the wear on the bearing surface. In addition to reduction of wear, the slower relative movement of the parts should reduce the tendency of the bearing to heat since the heating effect is largely dependent on the speed.

Moreover, in a bearing having a porous metallic lining bonded to a steel reinforcing member any overheating of the bearing is liable to break down the bearing entirely because of absorption of the bonding medium by the porous bearing lining when the bearing becomes abnormally heated. In a bearing made according to this invention this difficulty is eliminated and it is obvious that the bearing disclosed herein can operate at higher temperatures than one in which a porous lining is bonded to the backing.

In addition, in a bearing of this character in which an intermediary part "creeps", that is moves relatively to both of two relatively moving parts, such as a shaft and supporting member for the intermediary part the load is more evenly distributed.

While the form of embodiment of the present invention as herein disclosed, constitutes a preferred form, it is to be understood that other forms might be adopted, all coming within the scope of the claims which follow.

What is claimed is as follows:

1. A bearing assembly comprising: two semi-cylindrical porous cellular metal plates fitting snugly upon a shaft and saturated with lubricant within their cells for automatic lubrication of both the outer and inner surfaces of said plates, and an outside metal body having a cylindrical bearing for said self-lubricated porous plates.

2. A bearing assembly comprising: two semi-cylindrical porous cellular metal plates fitting snugly upon a shaft and saturated with lubricant within their cells for automatic lubrication of both the outer and inner surfaces of said plates, and an outside metal body having a cylindrical bearing for said self-lubricated porous plates, said porous plates having a radial thickness extremely small relative to their radius.

3. A bearing assembly comprising: two semi-cylindrical porous cellular metal plates fitting snugly upon a shaft and saturated with lubricant within their cells for automatic lubrication of both the outer and inner surfaces of said plates, and an outside metal body having a cylindrical bearing for said self-lubricated porous plates, said porous plates having a radial thickness of the order of only several hundredths of an inch whereby said plates function merely as a self-lubricating lamina between the shaft and said outside body.

4. A bearing for a rotating shaft comprising: two very thin semi-cylindrical porous cellular metal laminæ surrounding said shaft and saturated with a lubricant, and an exterior bearing member rotatably fitted upon the outer surface of said lubricating laminæ, whereby relative rotation between said shaft and exterior bearing member is facilitated by said lubricating laminæ.

In testimony whereof I hereto affix my signature.

CHARLES R. SHORT.